United States Patent
Kim et al.

(10) Patent No.: US 11,831,047 B2
(45) Date of Patent: Nov. 28, 2023

(54) MEMBRANE HUMIDIFIER FOR FUEL CELL, AND FUEL CELL SYSTEM COMPRISING SAME

(71) Applicant: KOLON INDUSTRIES, INC., Seoul (KR)

(72) Inventors: Do Woo Kim, Seoul (KR); Kyoung Ju Kim, Seoul (KR); Na Hyeon An, Seoul (KR)

(73) Assignee: KOLON INDUSTRIES, INC., Seoul (KR)

(*) Notice: Subject to any disclaimer, the term of this patent is extended or adjusted under 35 U.S.C. 154(b) by 279 days.

(21) Appl. No.: 17/418,257

(22) PCT Filed: Mar. 9, 2020

(86) PCT No.: PCT/KR2020/003274
§ 371 (c)(1),
(2) Date: Jun. 25, 2021

(87) PCT Pub. No.: WO2020/180169
PCT Pub. Date: Sep. 10, 2020

(65) Prior Publication Data
US 2022/0093946 A1 Mar. 24, 2022

(30) Foreign Application Priority Data
Mar. 7, 2019 (KR) .................. 10-2019-0026120

(51) Int. Cl.
*H01M 8/04119* (2016.01)
*B01D 63/04* (2006.01)
(Continued)

(52) U.S. Cl.
CPC ........ *H01M 8/04149* (2013.01); *B01D 63/04* (2013.01); *H01M 8/04014* (2013.01);
(Continued)

(58) Field of Classification Search
CPC ........ H01M 8/04007; H01M 8/04014; H01M 8/04029; H01M 8/04074; H01M 8/04126;
(Continued)

(56) References Cited

U.S. PATENT DOCUMENTS

2009/0317676 A1* 12/2009 Andreas-Schott ..........................
H01M 8/04828
429/423
2010/0086818 A1* 4/2010 Konrad ............. H01M 8/04149
429/411
(Continued)

FOREIGN PATENT DOCUMENTS

DE 102014225715 A1 12/2015
JP 2000003720 A 1/2000
(Continued)

OTHER PUBLICATIONS

KR office action dated Jan. 3, 2022.
The Search report dated Jul. 12, 2023 related to the corresponding European Patent application.

*Primary Examiner* — Matthew W Van Oudenaren
(74) *Attorney, Agent, or Firm* — Harvest IP Law, LLP

(57) ABSTRACT

The present invention relates to a membrane humidifier for a fuel cell capable of simplifying a fuel cell system and miniaturizing the fuel cell system by performing humidification by moisture exchange and cooling by heat exchange in one membrane humidifier, and a fuel cell system comprising same. The membrane humidifier for a fuel cell of the present invention comprises both a humidification module and a heat exchange module in a housing part, and distributes a first fluid to the humidification module and the heat exchange module at a variable distribution ratio.

14 Claims, 13 Drawing Sheets

(51) Int. Cl.
    *H01M 8/04007*     (2016.01)
    *H01M 8/04029*     (2016.01)
    *H01M 8/04014*     (2016.01)

(52) U.S. Cl.
    CPC .... *H01M 8/04029* (2013.01); *H01M 8/04074* (2013.01); *H01M 8/04141* (2013.01)

(58) Field of Classification Search
CPC ......... H01M 8/04141; H01M 8/04149; H01M 8/04335; H01M 8/0435; H01M 8/04507; H01M 8/04522; H01M 8/04716; H01M 8/04708; H01M 8/04835; H01M 8/04843; B01D 63/031; B01D 63/032; B01D 63/033; B01D 63/034; F28F 9/0246; F28F 9/026; F28F 2009/0287; F28F 2009/222; F28F 2009/224; F28F 2009/226; F28F 2009/228; F28F 27/02; F28F 2021/0043; F28D 7/1615; F28D 7/163; F28D 21/0015

See application file for complete search history.

(56) References Cited

U.S. PATENT DOCUMENTS

| | | |
|---|---|---|
| 2014/0227618 A1 | 8/2014 | Handgraetinger |
| 2015/0004504 A1 | 1/2015 | Bardeleben |

FOREIGN PATENT DOCUMENTS

| | | |
|---|---|---|
| JP | 2003178781 A | 6/2003 |
| JP | 2008108473 A | 5/2008 |
| JP | 2008300324 A | 12/2008 |
| KR | 20090025668 A | 3/2009 |
| KR | 20120124666 A | 11/2012 |
| KR | 20150072666 A | 6/2015 |
| WO | 2008000001 A1 | 1/2008 |

* cited by examiner

MEMBRANE HUMIDIFIER FOR FUEL CELL, AND FUEL CELL SYSTEM COMPRISING SAME

CROSS REFERENCE TO RELATED APPLICATIONS

This application is a National Stage of International Application No. PCT/KR2020/003274 filed Mar. 9, 2020, claiming priority based on Korean Patent Application No. 10-2019-0026120 filed Mar. 7, 2019.

TECHNICAL FIELD

The present disclosure relates to a fuel cell membrane humidifier and a fuel cell system including the same, and more particularly to a fuel cell membrane humidifier capable of performing humidification through moisture exchange and cooling through heat exchange alone, thereby realizing simplification and miniaturization of a fuel cell system, and a fuel cell system including the same.

BACKGROUND ART

A fuel cell is a power generation cell that combines hydrogen and oxygen to generate electricity. Such a fuel cell has advantages in that it is possible to continuously generate electricity as long as hydrogen and oxygen are supplied, unlike a general chemical cell, such as a dry cell or a storage cell, and in that there is no heat loss, whereby efficiency of the fuel cell is about twice as high as efficiency of an internal combustion engine.

In addition, the fuel cell directly converts chemical energy generated by combination of hydrogen and oxygen into electrical energy, whereby the amount of contaminants that are discharged is small. Consequently, the fuel cell has advantages in that the fuel cell is environmentally friendly and in that a concern about depletion of resources due to an increase in energy consumption can be reduced.

Based on the kind of an electrolyte that is used, such a fuel cell may generally be classified as a polymer electrolyte membrane fuel cell (PEMFC), a phosphoric acid fuel cell (PAFC), a molten carbonate fuel cell (MCFC), a solid oxide fuel cell (SOFC), or an alkaline fuel cell (AFC).

These fuel cells are operated fundamentally by the same principle, but are different from each other in terms of the kind of fuel that is used, operating temperature, catalyst, and electrolyte. Among these fuel cells, the polymer electrolyte membrane fuel cell is known as being the most favorable to a transportation system as well as small-scale stationary power generation equipment, since the polymer electrolyte membrane fuel cell is operated at a lower temperature than the other fuel cells and the output density of the polymer electrolyte membrane fuel cell is high, whereby it is possible to miniaturize the polymer electrolyte membrane fuel cell.

One of the most important factors in improving the performance of the polymer electrolyte membrane fuel cell is to supply a predetermined amount or more of moisture to a polymer electrolyte membrane or a proton exchange membrane (PEM) of a membrane electrode assembly (MEA) in order to retain moisture content. The reason for this is that, in the case in which the polymer electrolyte membrane or the proton exchange membrane is dried, power generation efficiency is abruptly reduced.

1) A bubbler humidification method of filling a pressure-resistant container with water and allowing a target gas to pass through a diffuser in order to supply moisture, 2) a direct injection method of calculating the amount of moisture to be supplied that is necessary for fuel cell reaction and directly supplying moisture to a gas stream pipe through a solenoid valve, and 3) a membrane humidification method of supplying moisture to a gas fluid bed using a polymer separation membrane are used as methods of humidifying the polymer electrolyte membrane or the proton exchange membrane.

Among these methods, the membrane humidification method, which provides water vapor to a gas that is supplied to the polymer electrolyte membrane or the proton exchange membrane using a membrane configured to selectively transmit only water vapor included in off-gas in order to humidify the polymer electrolyte membrane or the proton exchange membrane, is advantageous in that it is possible to reduce the weight and size of a humidifier.

In the case in which a module is formed, a hollow fiber membrane having large transmission area per unit volume is suitable for the selective transmission membrane used in the membrane humidification method. That is, in the case in which a humidifier is manufactured using a hollow fiber membrane, high integration of the hollow fiber membrane having large contact surface area is possible, whereby it is possible to sufficiently humidify a fuel cell even in the case of a small capacity, it is possible to use a low-priced material, and it is possible to collect moisture and heat included in off-gas discharged from the fuel cell at a high temperature and to reuse the collected moisture and heat through the humidifier.

Meanwhile, in a fuel cell system, high-temperature dry air generated from a compressor or a blower is introduced into a fuel cell stack through a membrane humidifier. At this time, the high-temperature dry air passes through a heat exchanger, such as an air cooler, in which heat exchange is performed such that the air is suitable for operation conditions of the fuel cell stack, is humidified through the membrane humidifier, and is supplied to the fuel cell stack.

To date, the heat exchanger and the membrane humidifier have been arranged in series in order to perform heat exchange and humidification (moisture control), which requires installation of an additional air cooler between the membrane humidifier and the blower.

However, the volume of the air cooler is large, whereby the air cooler is disadvantageous in package application, and pressure loss of air compressed by the blower is increased. In addition, a coolant channel is additionally required, whereby facility is complicated, which is disadvantageous in miniaturization.

RELATED PATENT DOCUMENTS

1. Korean Patent Application Publication No. 10-2009-0013304
2. Korean Patent Application Publication No. 10-2009-0057773
3. Korean Patent Application Publication No. 10-2009-0128005
4. Korean Patent Application Publication No. 10-2000-0108092
5. Korean Patent Application Publication No. 10-2000-0131631
6. Korean Patent Application Publication No. 10-2001-0001022
7. Korean Patent Application Publication No. 10-2001-0006122
8. Korean Patent Application Publication No. 10-2001-0006128

9. Korean Patent Application Publication No. 10-2001-0021217
10. Korean Patent Application Publication No. 10-2001-0026696
11. Korean Patent Application Publication No. 10-2001-0063366

DISCLOSURE

Technical Problem

It is an object of the present disclosure to provide a fuel cell membrane humidifier capable of performing humidification through moisture exchange and cooling through heat exchange alone, thereby realizing simplification and miniaturization of a fuel cell system, and a fuel cell system including the same.

Technical Solution

A fuel cell membrane humidifier according to an embodiment of the present disclosure includes a housing unit having first and second spaces, between which a partition wall is disposed, a humidification module disposed in the first space, the humidification module including a plurality of hollow fiber membranes, moisture exchange being performed between a first fluid and a second fluid through the plurality of hollow fiber membranes, the second fluid having higher humidity than the first fluid, a heat exchange module disposed in the second space, the heat exchange module being configured to cool the first fluid introduced thereinto, and a channel valve configured to distribute the first fluid to the humidification module and the heat exchange module at a variable distribution ratio.

In the fuel cell membrane humidifier according to the embodiment of the present disclosure, the housing unit may include a housing body having the first and second spaces defined therein and housing caps coupled respectively to opposite ends of the housing body, the housing caps being provided respectively with a first fluid inlet, through which the first fluid is introduced, and a first fluid outlet, through which the first fluid is discharged, and the housing cap provided with the first fluid inlet may include the channel valve and a cap partition wall configured to guide the first fluid to the humidification module and the heat exchange module according to a distribution ratio set by the channel valve.

In the fuel cell membrane humidifier according to the embodiment of the present disclosure, the housing unit may include a housing body having the first and second spaces defined therein, the housing body being provided with a first fluid inlet, through which the first fluid is introduced, and a first fluid outlet, through which the first fluid is discharged, and housing caps coupled respectively to opposite ends of the housing body, the housing caps being provided respectively with a second fluid inlet, through which the second fluid is introduced, and a second fluid outlet, through which the second fluid is discharged, and the housing body may include an extending partition wall configured to guide the first fluid to the humidification module and the heat exchange module according to a distribution ratio set by the channel valve.

In the fuel cell membrane humidifier according to the embodiment of the present disclosure, the housing unit may include a housing body having the first and second spaces defined therein, the housing body being provided in one surface thereof with a first fluid inlet, through which the first fluid is introduced, and a first fluid outlet, through which the first fluid is discharged, and housing caps coupled respectively to opposite ends of the housing body, the housing caps being provided respectively with a second fluid inlet, through which the second fluid is introduced, and a second fluid outlet, through which the second fluid is discharged, and the housing body may include an extending partition wall configured to guide the first fluid introduced through the first fluid inlet to the humidification module and the heat exchange module according to a distribution ratio set by the channel valve and an intersecting partition wall configured to prevent the first fluid flowing from the first fluid inlet to the humidification module and the heat exchange module from being mixed with the first fluid flowing from the humidification module and the heat exchange module to the first fluid outlet.

In the fuel cell membrane humidifier according to the embodiment of the present disclosure, the heat exchange module may be a shell and tube type heat exchange module, a honeycomb type heat exchange module, or a plate type heat exchange module.

In the fuel cell membrane humidifier according to the embodiment of the present disclosure, the channel valve may be configured to be controlled depending on the output state of a fuel cell stack.

In the fuel cell membrane humidifier according to the embodiment of the present disclosure, the housing unit may include a coolant inlet, through which a coolant is supplied to the heat exchange module, and a coolant outlet, through which the coolant, after performing cooling, is discharged, and the coolant inlet may be connected to a bypass channel configured to bypass at least a portion of outside air that would otherwise be introduced into an air compression means.

A fuel cell system according to an embodiment of the present disclosure includes an air compression means configured to receive and compress outside air in order to generate a first fluid, a fuel cell stack configured to generate a second fluid through reaction between hydrogen and oxygen, the second fluid having higher humidity than the first fluid, and a fuel cell membrane humidifier including a humidification module configured to humidify the first fluid using moisture exchange between the first and second fluids, a heat exchange module configured to cool the first fluid, and a channel valve configured to distribute the first fluid to the humidification module and the heat exchange module at a variable distribution ratio.

In the fuel cell system according to the embodiment of the present disclosure, the fuel cell membrane humidifier may include a housing unit having first and second spaces, between which a partition wall is disposed, the humidification module may be disposed in the first space, the humidification module including a plurality of hollow fiber membranes, the moisture exchange being performed between the first fluid and the second fluid through the plurality of hollow fiber membranes, and the heat exchange module may be disposed in the second space, the heat exchange module being configured to cool the first fluid introduced thereinto.

In the fuel cell system according to the embodiment of the present disclosure, the housing unit may include a housing body having the first and second spaces defined therein and housing caps coupled respectively to opposite ends of the housing body, the housing caps being provided respectively with a first fluid inlet, through which the first fluid is introduced, and a first fluid outlet, through which the first fluid is discharged, and the housing cap provided with the first fluid inlet may include the channel valve and a cap partition wall configured to guide the first fluid to the humidification module and the heat exchange module according to a distribution ratio set by the channel valve.

In the fuel cell system according to the embodiment of the present disclosure, the housing unit may include a housing body having the first and second spaces defined therein, the housing body being provided with a first fluid inlet, through which the first fluid is introduced, and a first fluid outlet, through which the first fluid is discharged, and housing caps coupled respectively to opposite ends of the housing body, the housing caps being provided respectively with a second fluid inlet, through which the second fluid is introduced, and a second fluid outlet, through which the second fluid is discharged, and the housing body may include an extending partition wall configured to guide the first fluid to the humidification module and the heat exchange module according to a distribution ratio set by the channel valve.

In the fuel cell system according to the embodiment of the present disclosure, the housing unit may include a housing body having the first and second spaces defined therein, the housing body being provided in one surface thereof with a first fluid inlet, through which the first fluid is introduced, and a first fluid outlet, through which the first fluid is discharged, and housing caps coupled respectively to opposite ends of the housing body, the housing caps being provided respectively with a second fluid inlet, through which the second fluid is introduced, and a second fluid outlet, through which the second fluid is discharged, and the housing body may include an extending partition wall configured to guide the first fluid introduced through the first fluid inlet to the humidification module and the heat exchange module according to a distribution ratio set by the channel valve and an intersecting partition wall configured to prevent the first fluid flowing from the first fluid inlet to the humidification module and the heat exchange module from being mixed with the first fluid flowing from the humidification module and the heat exchange module to the first fluid outlet.

The fuel cell system according to the embodiment of the present disclosure may further include a sensing unit configured to sense the output state of the fuel cell stack and a controller configured to output a control signal for controlling the channel valve based on the output state of the fuel cell stack sensed by the sensing unit.

In the fuel cell system according to the embodiment of the present disclosure, the housing unit may include a coolant inlet, through which a coolant is supplied to the heat exchange module, and a coolant outlet, through which the coolant, after performing cooling, is discharged, and the coolant inlet may be connected to a bypass channel configured to bypass at least a portion of outside air that would otherwise be introduced into the air compression means.

The details of other embodiments according to various aspects of the present disclosure are included in the following detailed description of the present disclosure.

Advantageous Effects

According to embodiments of the present disclosure, a single membrane humidifier is capable of performing humidification through moisture exchange and cooling through heat exchange, whereby it is possible to realize simplification and miniaturization of a fuel cell system.

BEST MODE

Hereinafter, a fuel cell membrane humidifier according to the present disclosure and a fuel cell system including the same will be described with reference to the accompanying drawings.

Figure 1:
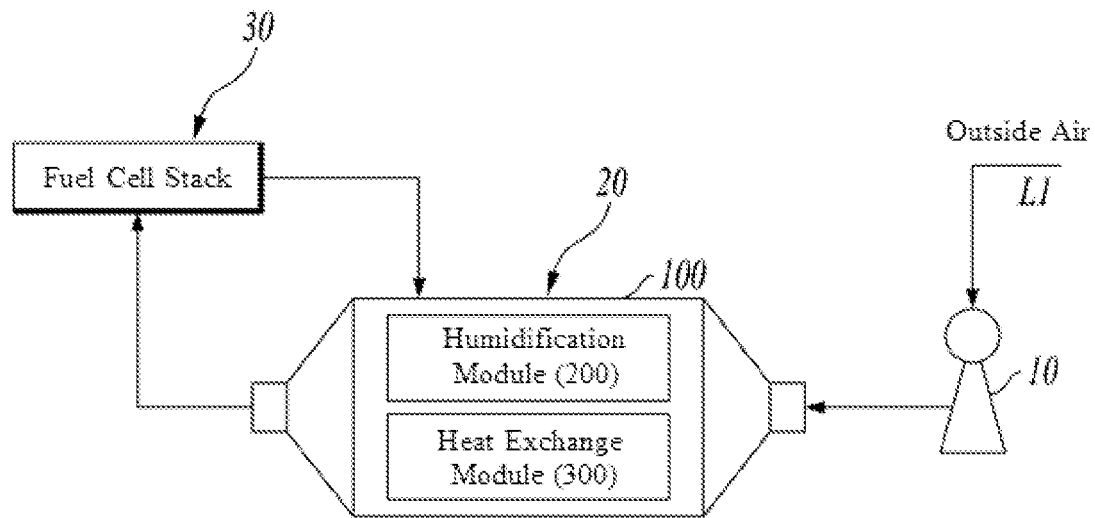
FIG. 1 is a schematic view of a fuel cell system including a fuel cell membrane humidifier according to an embodiment of the present disclosure.

FIG. 1 is a schematic view of a fuel cell system including a fuel cell membrane humidifier according to an embodiment of the present disclosure. As shown in FIG. 1, the fuel cell system according to the embodiment of the present disclosure includes an air compression means 10, a fuel cell membrane humidifier 20, and a fuel cell stack 30.

The air compression means 10 receives outside air from an outside air supply channel L1, compresses the received outside air to generate a first fluid, and supplies the generated first fluid to the fuel cell membrane humidifier 20. The air compression means 10 is an apparatus for compressing a fluid, such as air, and may be a blower or a compressor.

The fuel cell membrane humidifier 20 receives the first fluid, which is high-temperature dry air, from the air compression means 10. In addition, the fuel cell membrane humidifier 20 receives a second fluid, which is high-temperature, high-humidity off-gas, discharged from the fuel cell stack 30.

In a humidification module 200 of the fuel cell membrane humidifier 20, at least a portion of the first fluid (may be all or none depending on operation conditions) exchanges moisture with the second fluid. The first fluid, humidified by moisture exchange, is supplied to the fuel cell stack 30.

Depending on operation conditions, at least a portion of the first fluid (may be all or none depending on operation conditions) may not be humidified in the humidification module 200 and may pass through a heat exchange module 300. At this time, the first fluid may be converted from high-temperature dry air to low-temperature dry air through heat exchange, and may be mixed with the moisture-contained air that has passed through the humidification module 200 (i.e. the humidified first fluid). The mixture may be supplied to the fuel cell stack 30. Reference numeral 100 indicates a housing unit.

The fuel cell stack 30 is an electricity generation assembly constituted by a plurality of continuously arranged unit cells. Each unit cell is provided as a unit fuel cell configured to generate electrical energy through electrochemical reaction between hydrogen and oxygen. Each unit cell includes a membrane electrode assembly and separators disposed at opposite sides thereof in tight contact. Each of the separators is configured in the shape of a conductive plate, and the separators form channels configured to allow fuel and air to flow to the tight contact surfaces of the membrane electrode assembly. A fuel electrode is formed at one surface of the membrane electrode assembly, an air electrode is formed at the other surface of the membrane electrode assembly, and an electrolyte membrane is formed between the fuel electrode and the air electrode.

The fuel electrode divides hydrogen supplied through the channel of a corresponding one of the separators into electrons and protons through oxidation reaction, and the electrolyte membrane moves the protons to the cathode. The air electrode generates water and heat from the electrons and the protons received from the fuel electrode and oxygen in air received through the channel of a corresponding one of the separators through reduction reaction. The relatively high-humidity off-gas generated as the result of reaction between hydrogen and oxygen, i.e. the second fluid, is supplied from the fuel cell stack 30 to the fuel cell membrane humidifier 20.

In the fuel cell system according to the embodiment of the present disclosure, as described above, the humidification module 200 for moisture exchange and the heat exchange module 300 for heat exchange are disposed in parallel in the single housing unit 100 in an integrated state, whereby the fuel cell system is simplified, and the fuel cell system is miniaturized through a reduction in size thereof.

Hereinafter, a fuel cell membrane humidifier 20 according to an embodiment of the present disclosure will be described with reference to FIGS. 2 to 11.

Figure 2:
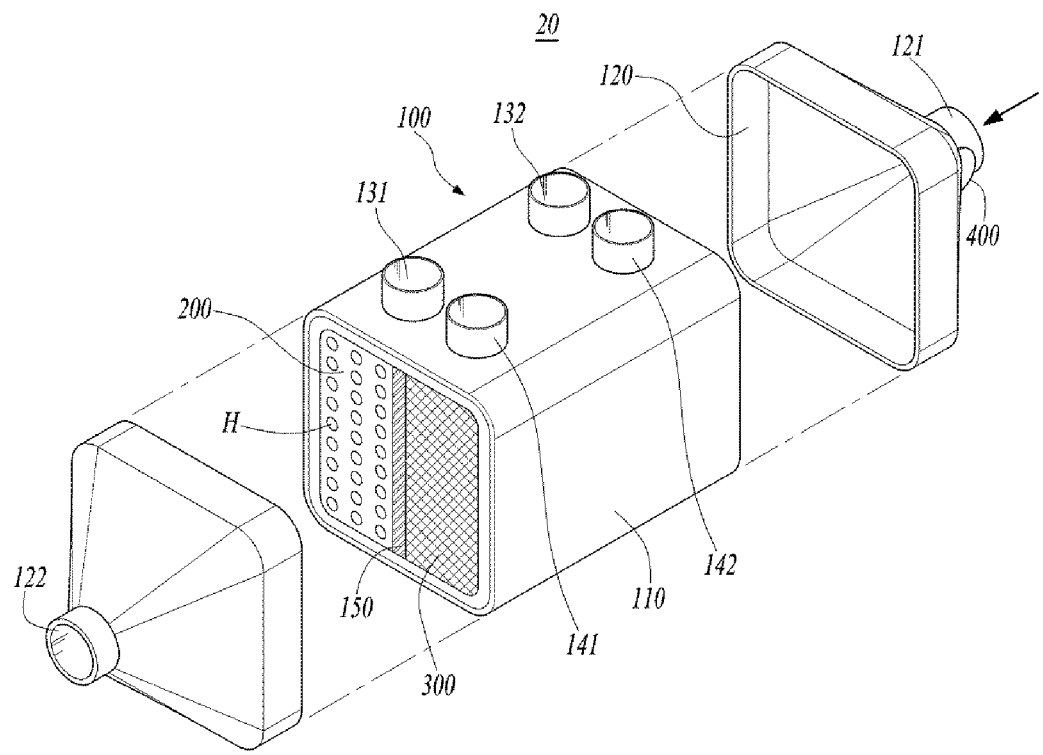
FIG. 2 is an exploded perspective view of a fuel cell membrane humidifier according to an embodiment of the present disclosure.
Figure 3:
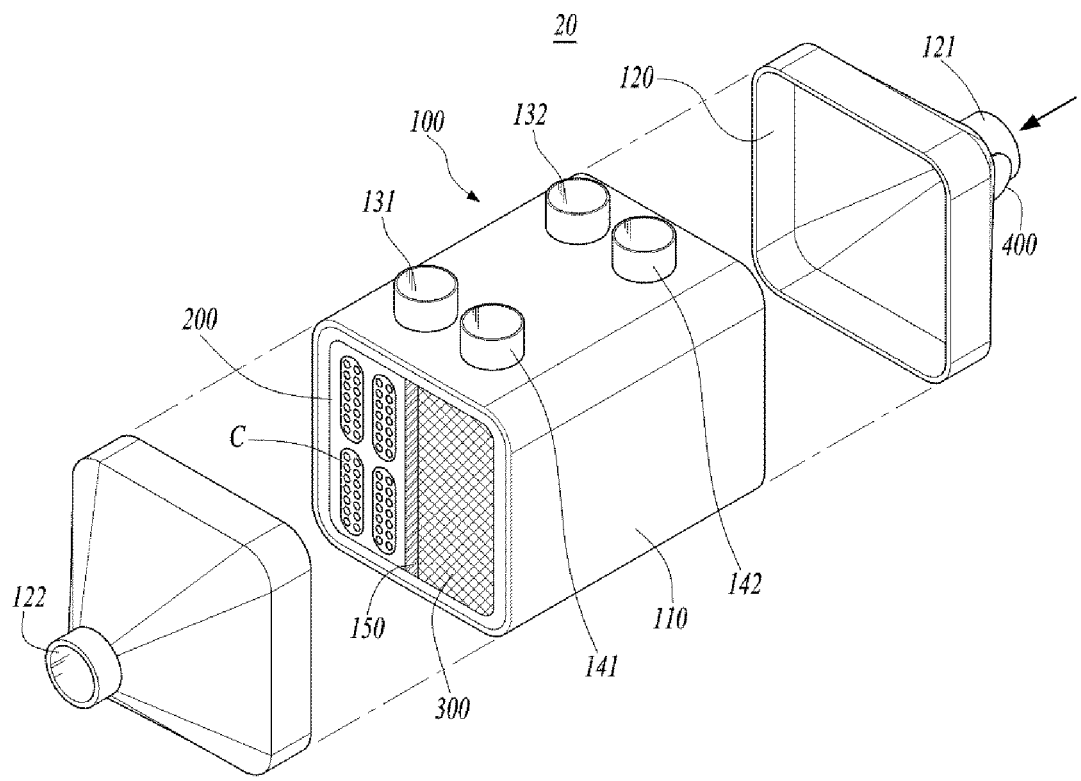
FIG. 3 shows an illustrative modification of the fuel cell membrane humidifier of FIG. 2.
Figure 4:
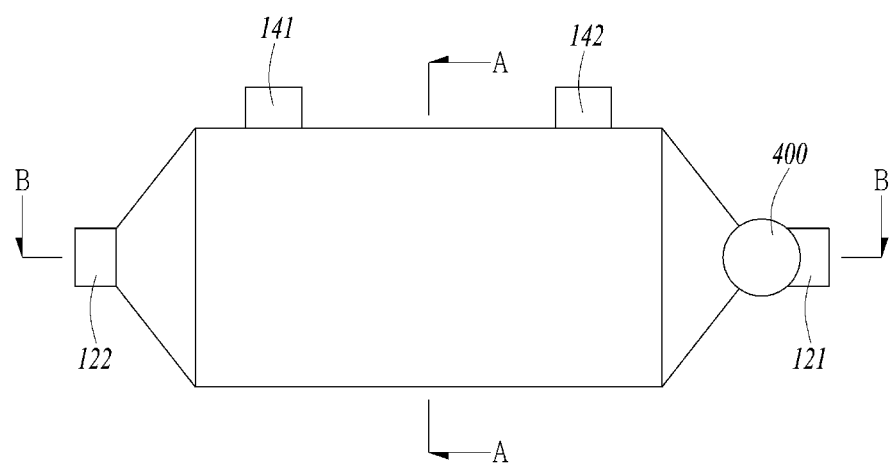
FIG. 4 is a front view of the fuel cell membrane humidifier of FIG. 2.
Figure 5:
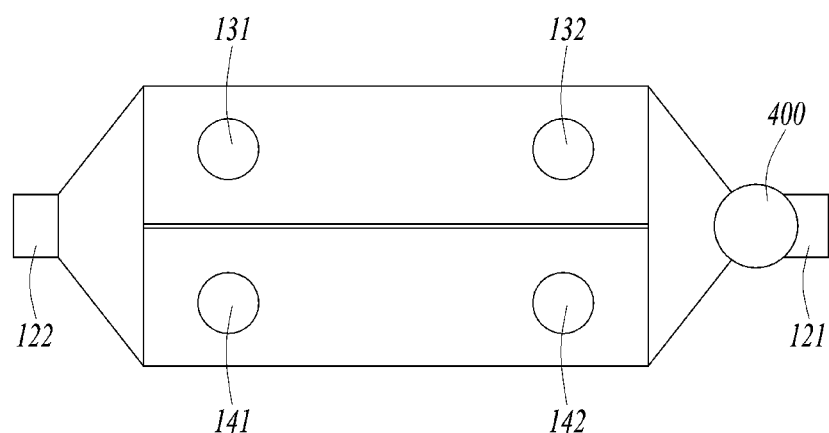
FIG. 5 is a plan view of the fuel cell membrane humidifier of FIG. 2.
Figure 6:
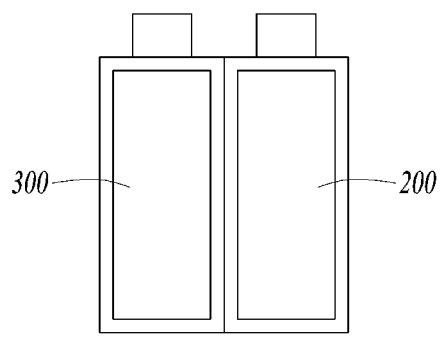
FIG. 6 is a sectional view of the fuel cell membrane humidifier when viewed from line A-A of FIG. 4.
Figure 7:
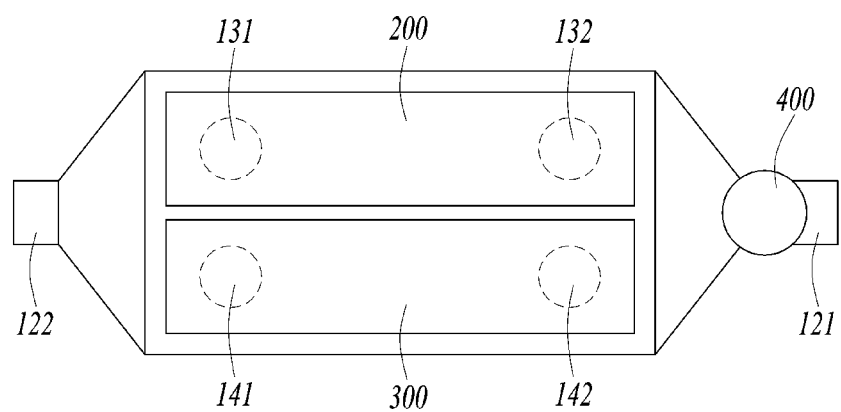
FIG. 7 is a sectional view of the fuel cell membrane humidifier when viewed from line B-B of FIG. 4.

FIG. 2 is an exploded perspective view of a fuel cell membrane humidifier according to an embodiment of the present disclosure, FIG. 3 shows an illustrative modification of the fuel cell membrane humidifier of FIG. 2, FIG. 4 is a front view of the fuel cell membrane humidifier of FIG. 2, FIG. 5 is a plan view of the fuel cell membrane humidifier of FIG. 2, FIG. 6 is a sectional view of the fuel cell membrane humidifier when viewed from line A-A of FIG. 4, and FIG. 7 is a sectional view of the fuel cell membrane humidifier when viewed from line B-B of FIG. 4.

As shown in FIGS. 2 to 7, the fuel cell membrane humidifier 20 according to the embodiment of the present disclosure includes a housing unit 100 having first and second spaces, between which a partition wall is disposed, a humidification module 200 disposed in the first space, a heat exchange module 300 disposed in the second space, and a channel valve 400.

The housing unit 100 defines the external appearance of the membrane humidifier 20. The housing unit 100 may include a housing body 110 having the first and second spaces defined therein, and housing caps 120 coupled respectively to opposite ends of the housing body 110. The housing body and the housing caps may be integrally coupled to each other. Each of the housing body 110 and the housing caps 120 may be made of hard plastic, such as polycarbonate, or metal.

As described above, the inner space of the housing body 110 is divided into two spaces (i.e. the first and second spaces) by the partition wall 150, and the humidification module 200, which is configured to perform moisture exchange, and the heat exchange module 300, which is configured to perform cooling through heat exchange, are disposed in the first and second spaces, respectively (see FIG. 6).

In addition, the cross-sectional shape of each of the housing body 110 and the housing caps 120 in the lateral direction thereof may be a polygon or a circle. The polygon may be a rectangle, a square, a trapezoid, a parallelogram, a pentagon, or a hexagon, and corners of the polygon may be round. In addition, the circle may be an oval.

Referring to FIG. 7, the portion of the housing body 110 corresponding to the humidification module 200 is provided with a second fluid inlet 131, through which a second fluid is introduced, and a second fluid outlet 132, through which the second fluid is discharged.

The housing caps 120 are coupled respectively to opposite ends of the housing body 110. A first fluid inlet 121, through which a first fluid is introduced, is formed in one of the housing caps 120, and a first fluid outlet 122, through which the first fluid is discharged, is formed in the other housing cap 120.

The first fluid may be a relatively low-humidity fluid, and the second fluid may be a relatively high-humidity fluid. More specifically, the first fluid may be dry air compressed by the air compression means 10, and the second fluid may be high-humidity off-gas discharged from the fuel cell stack 30.

The portion of the housing body 110 corresponding to the heat exchange module 300 is provided with a coolant inlet 141, through which a coolant is supplied to the heat exchange module 300, and a coolant outlet 142, through which the coolant, after performing cooling, is discharged. Cooling of the heat exchange module 300 may be performed in an air cooling mode or a water cooling mode, and the coolant may be air or water supplied from outside.

The channel valve 400, which is configured to distribute the first fluid to the humidification module 200 and the heat exchange module 300 at a variable distribution ratio, is formed in the housing cap 120 in which the first fluid inlet 121 is formed. In addition, the housing cap 120 in which the first fluid inlet 121 is formed may further include a cap partition wall 123 configured to guide the first fluid to the humidification module 200 and the heat exchange module 300 according to the distribution ratio set by the channel valve 400. The partition wall 150, which divides the inner space of the housing body 110 into the first and second spaces, and the cap partition wall 123 may be separately formed or integrally formed.

At least a portion of the first fluid introduced through the first fluid inlet 121 is introduced into the humidification module 200, and the remainder of the first fluid is introduced into the heat exchange module 300. Depending on operation conditions, all of the first fluid is introduced into the humidification module 200 or into the heat exchange module 300.

As illustrated in FIG. 2, the humidification module 200 may include a plurality of hollow fiber membranes H configured to allow moisture to selectively pass therethrough. Alternatively, as illustrated in FIG. 3, a plurality of cartridges C, in each of which a plurality of hollow fiber membranes is received, may be disposed in the humidification module 200. For example, each of the hollow fiber membranes H may be made of Nafion, polyetherimide, polyphenylsulfone, polyimide, polysulfone, or polyether sulfone. Moisture exchange is performed between the first fluid and the second fluid, the humidity of which is higher than the humidity of the first fluid, through the hollow fiber membranes H.

The first fluid introduced into the humidification module 200 flows through lumina in the hollow fiber membranes H, is discharged out of the humidification module 200, is mixed with the first fluid that has passed through the heat exchange module 300, is discharged through the first fluid outlet 122, and is introduced into the fuel cell stack 30.

The humidification module 200 is provided at opposite ends thereof with potting units (not shown) configured to bind the hollow fiber membranes H and to fill gaps therebetween. As a result, the opposite ends of the humidification module 200 are blocked by the potting units, whereby a channel configured to allow the second fluid to pass therethrough is defined in the humidification module. Each of the potting units may be made of a known material, and therefore a detailed description thereof will be omitted from this specification.

Figure 8:
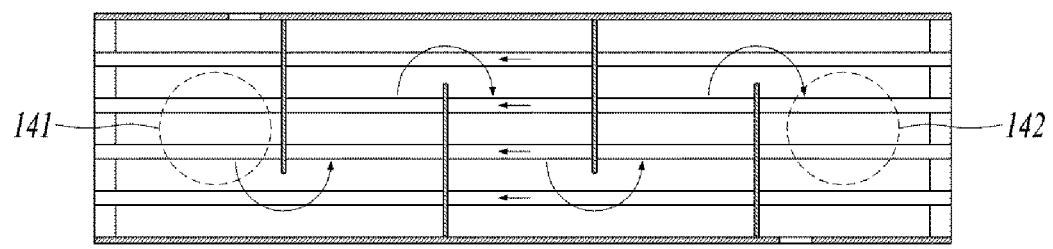
FIG. 8 illustrates a shell and tube type heat exchange module.

The heat exchange module 300, which is configured to cool the first fluid introduced thereinto, will be described with reference to FIGS. 8 to 10. FIG. 8 illustrates a shell and tube type heat exchange module, FIG. 9 illustrates a honeycomb type heat exchange module, and FIG. 10 illustrates a plate type heat exchange module.

The shell and tube type heat exchange module shown in FIG. 8 is configured to have a structure in which a bundle of tubes is received in a shell and in which a fluid flows through the tubes and another fluid flows through the shell, whereby heat is exchanged between the two fluids as the result of heat transfer. The bundle of tubes may include various kinds of tubes, such as flat tubes and vertical pin-shaped tubes.

When at least a portion of the first fluid (the dry air compressed by the air compression means 10) flows through the tubes (as indicated by straight arrows), the coolant introduced through the coolant inlet 141 flows in the shell (as indicated by curved arrows), cools the first fluid while contacting the tubes, and is discharged outside through the coolant outlet 142.

Figure 9:
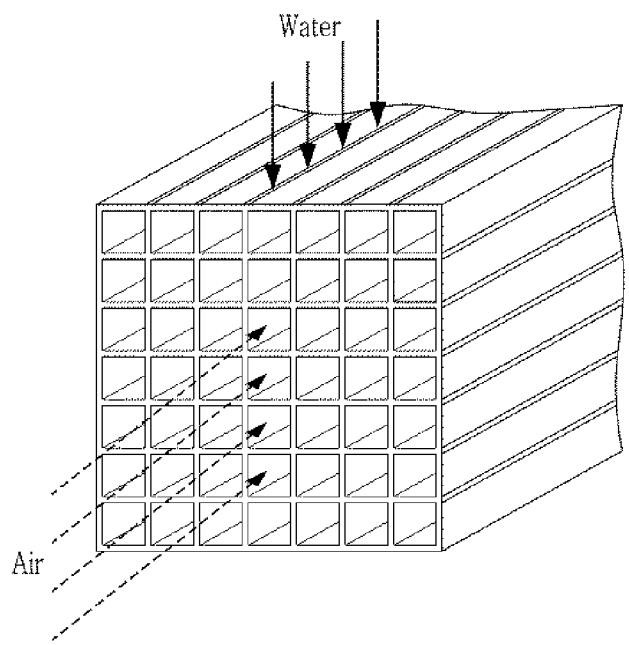
FIG. 9 illustrates a honeycomb type heat exchange module.
Figure 10:
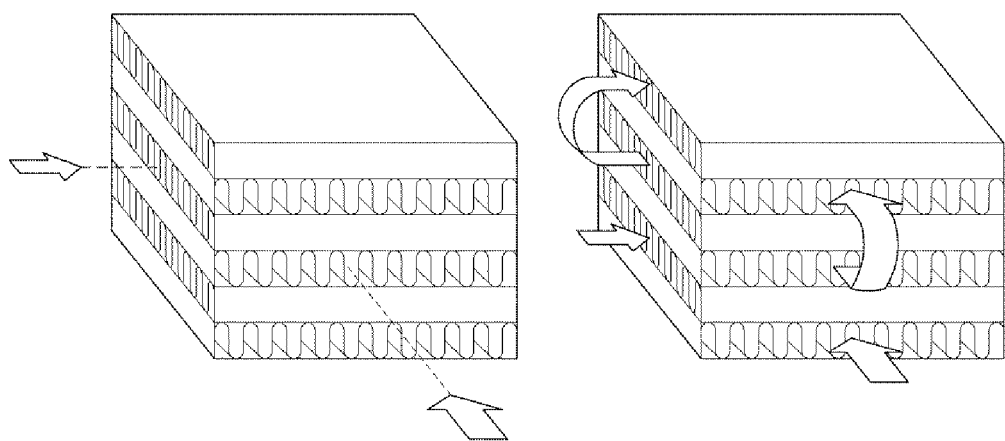
FIG. 10 illustrates a plate type heat exchange module.
Figure 11:
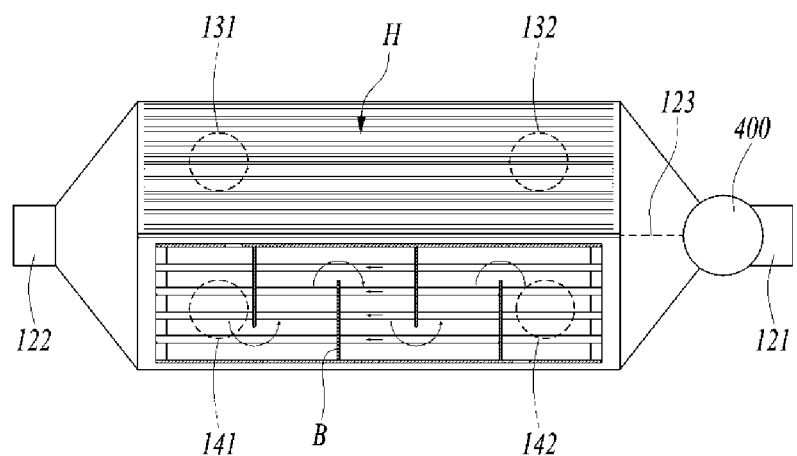
FIG. 11 illustrates a fuel cell membrane humidifier to which the shell and tube type heat exchange module of FIG. 8 is applied

The honeycomb type heat exchange module shown in FIG. 9 is a honeycomb type heat exchanger made of a ceramic material, and is configured to have a structure in which, when the first fluid (indicated by "air") flows in honeycomb pipelines, the coolant (indicated by "water") is supplied in a direction intersecting the pipelines in order to cool the first fluid.

The plate type heat exchange module shown in FIG. 10 includes heat transfer plates, which are formed using embossed stainless plates, wherein the heat transfer plates are disposed in the vertical direction such that herringbone patterns of the heat transfer plates are staggered such that the fluid is uniformly distributed to the heat transfer plates to form turbulence, whereby the coolant and the first fluid exchange heat with each other while flowing in opposite directions.

The first fluid introduced into the heat exchange module 300 passes through the interior of a heat exchanger constituting the heat exchange module 300, is discharged out of the heat exchange module 300, is mixed with the first fluid humidified by the humidification module 200, is discharged from the membrane humidifier 20 through the first fluid outlet 122, and is introduced into the fuel cell stack 30. The heat exchange modules of FIGS. 8 to 10 are provided merely for illustration, and the present disclosure is not limited thereto.

The channel valve 400 is rotatably installed in the housing cap 120 in which the first fluid inlet 121 is formed, and adjusts the flow direction and flow rate of the first fluid such that the first fluid is distributed to the humidification module 200 and the heat exchange module 300 at a variable distribution ratio. The channel valve 400 may be configured to be controlled depending on the output state of the fuel cell stack. That is, in an embodiment of the present disclosure, the distribution ratio of the first fluid may be controlled depending on the output state of the fuel cell stack. The channel valve 400 may include a valve unit 420 configured to be rotated by a rotor (not shown) and a rotary space 410 in which the valve unit 420 is rotatable (see FIGS. 17 to 19).

As the result of controlling the channel valve 400 of the present disclosure, (i) the first fluid may flow to the humidification module 200 and the heat exchange module 300 in equal amounts, (ii) the first fluid may flow to any one of the humidification module 200 and the heat exchange module 300 in a larger amount, or (iii) the first fluid may not flow to any one of the humidification module 200 and the heat exchange module 300.

The fuel cell system according to the embodiment of the present disclosure may further include a sensing unit (not shown) configured to sense the output state of the fuel cell stack and a controller (not shown) configured to output a control signal for controlling the channel valve 400 based on the output state of the fuel cell stack sensed by the sensing unit.

Figure 12:
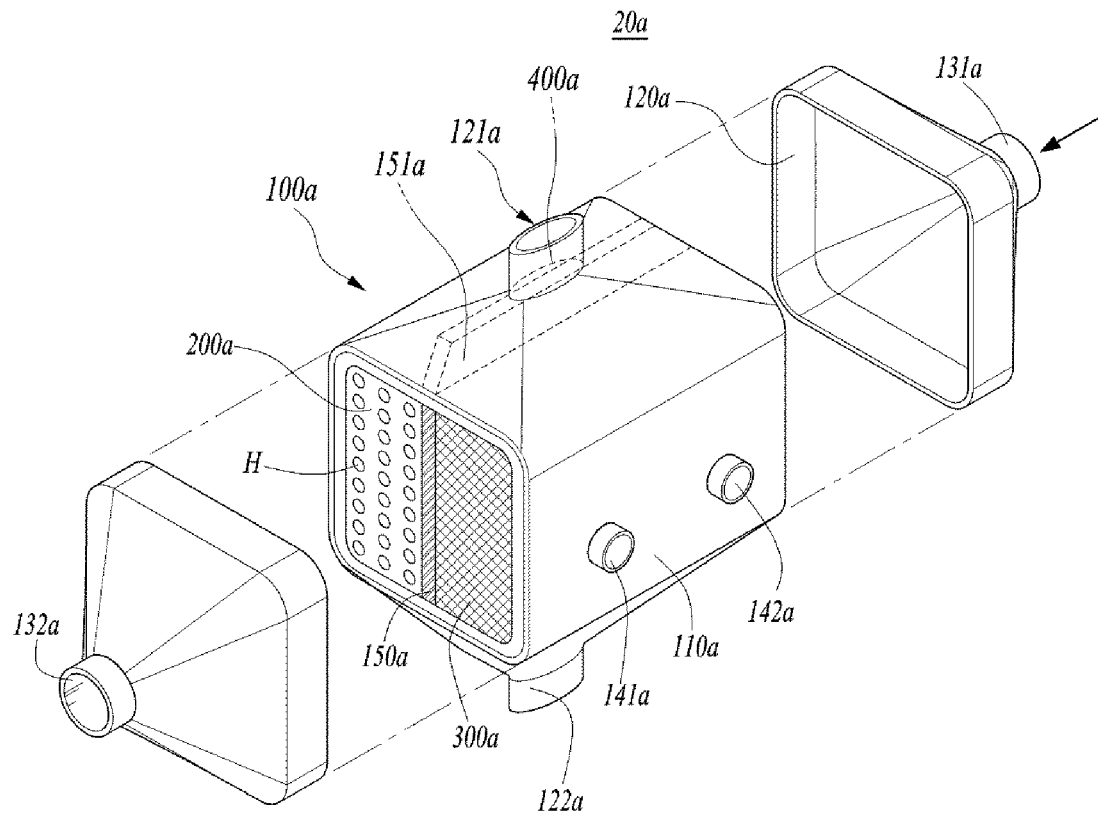
FIG. 12 is an exploded perspective view of a fuel cell membrane humidifier according to another embodiment of the present disclosure.

Next, a fuel cell membrane humidifier according to another embodiment of the present disclosure will be described with reference to FIGS. 12 to 14. FIG. 12 is an exploded perspective view of a fuel cell membrane humidifier 20a according to another embodiment of the present disclosure, FIG. 13 is a side view of the fuel cell membrane humidifier 20a of FIG. 12, and FIG. 14 shows an illustrative modification of the fuel cell membrane humidifier 20a of FIG. 12.

Figure 13:
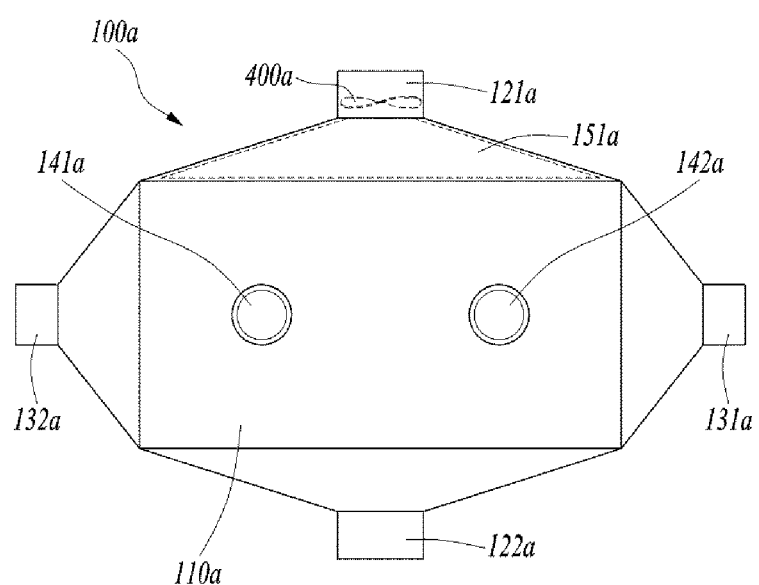
FIG. 13 is a front view of the fuel cell membrane humidifier of FIG. 12.
Figure 14:
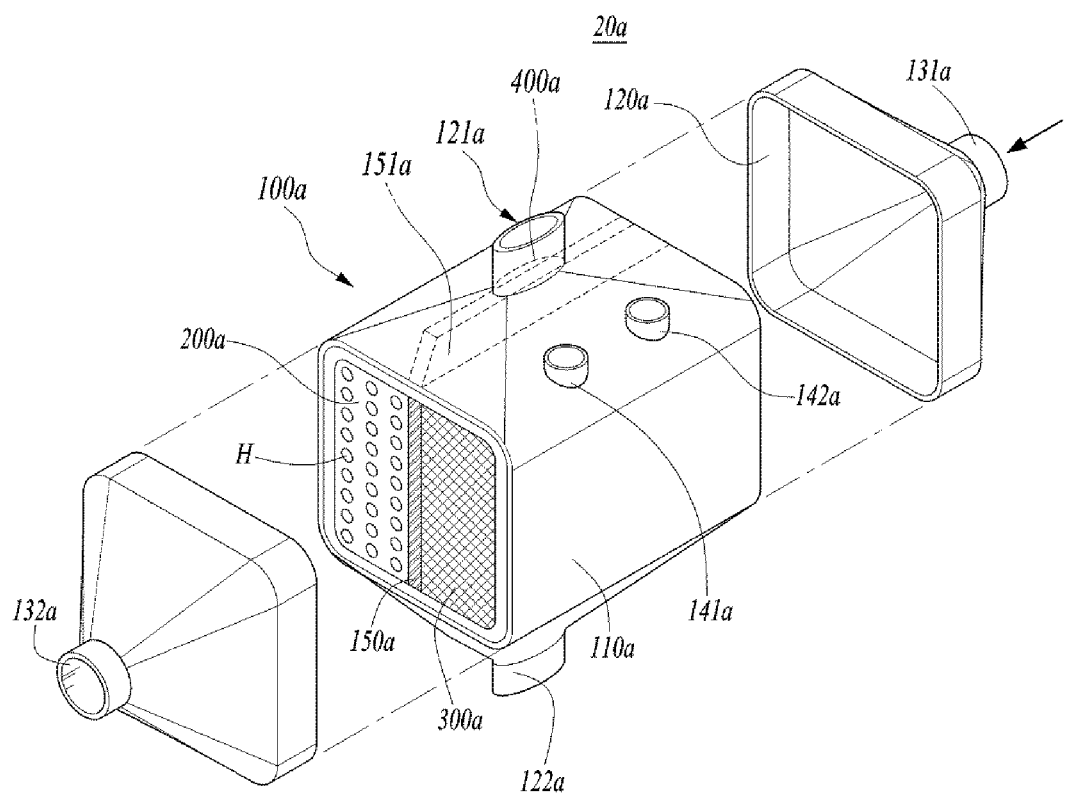
FIG. 14 shows an illustrative modification of the fuel cell membrane humidifier of FIG. 12.

Substantially similarly to the previous embodiment, the fuel cell membrane humidifier shown in FIGS. 12 to 14 includes a housing unit 100a, a humidification module 200a, a heat exchange module 300a, and a channel valve 400a. In this embodiment, however, a relatively high-humidity second fluid is introduced and discharged through housing caps 120a, and a relatively dry (low-humidity) first fluid is introduced and discharged through a housing body 110a.

A portion of an inner space of the housing body 110a is divided into two spaces, i.e. first and second spaces, by a partition wall 150a, and the humidification module 200a, which is configured to perform moisture exchange, and the heat exchange module 300a, which is configured to perform cooling through heat exchange, are disposed in the respective spaces.

A first fluid inlet 121a, through which the first fluid is introduced, and a first fluid outlet 122a, through which the first fluid is discharged, are formed in the housing body 110a. The channel valve 400a, which is configured to distribute the first fluid introduced into the first fluid inlet to the humidification module 200a and the heat exchange module 300a at a variable distribution ratio, is formed in the first fluid inlet 121*a*. In addition, the housing body 110*a* in which the first fluid inlet 121*a* is formed may include an extending partition wall 151*a* configured to guide the first fluid to the humidification module 200*a* and the heat exchange module 300*a* according to the distribution ratio set by the channel valve 400*a*. The partition wall 150*a*, which divides the inner space of the housing body 110*a* into the first and second spaces, and the extending partition wall 151*a* may be separately formed or integrally formed.

At least a portion of the first fluid introduced through the first fluid inlet 121*a* is introduced into the humidification module 200*a*, and the remainder of the first fluid is introduced into the heat exchange module 300*a*. Depending on operation conditions, all of the first fluid is introduced only into any one of the humidification module 200*a* and the heat exchange module 300*a*.

The portion of the housing body 110*a* corresponding to the heat exchange module 300*a* is provided with a coolant inlet 141*a*, through which a coolant is introduced, and a coolant outlet 142*a*, through which the coolant, after performing cooling, is discharged. The coolant inlet 141*a* and the coolant outlet 142*a* may be formed in a side surface of the housing body 110*a*. However, the present disclosure is not limited thereto. As shown in FIG. 14, the coolant inlet 141*a* and the coolant outlet 142*a* may be formed in the upper surface or the lower surface of the housing body 110*a*. In this case, the coolant inlet 141*a* and the coolant outlet 142*a* may be formed through the upper surface or the lower surface of the housing body 110*a* so as to be connected to the heat exchange module 300*a* such that the coolant is supplied to or discharged from the heat exchange module 300*a*.

The housing caps 120*a* are coupled respectively to opposite ends of the housing body 110*a*. A second fluid inlet 131*a*, through which the relatively high-humidity second fluid is introduced, is formed in one of the housing caps 120*a*, and a second fluid outlet 132*a*, through which the second fluid is discharged, is formed in the other housing cap 120*a*.

The humidification module 200*a* and the heat exchange module 300*a* are identical to the humidification module and the heat exchange module of the previous embodiment, and therefore a duplicate description thereof will be omitted. In addition, the channel valve 400*a* is substantially identical in function and construction to the channel valve of the previous embodiment except that the channel valve is installed in the first fluid inlet 121*a*, and therefore a duplicate description thereof will be omitted.

Figure 15:
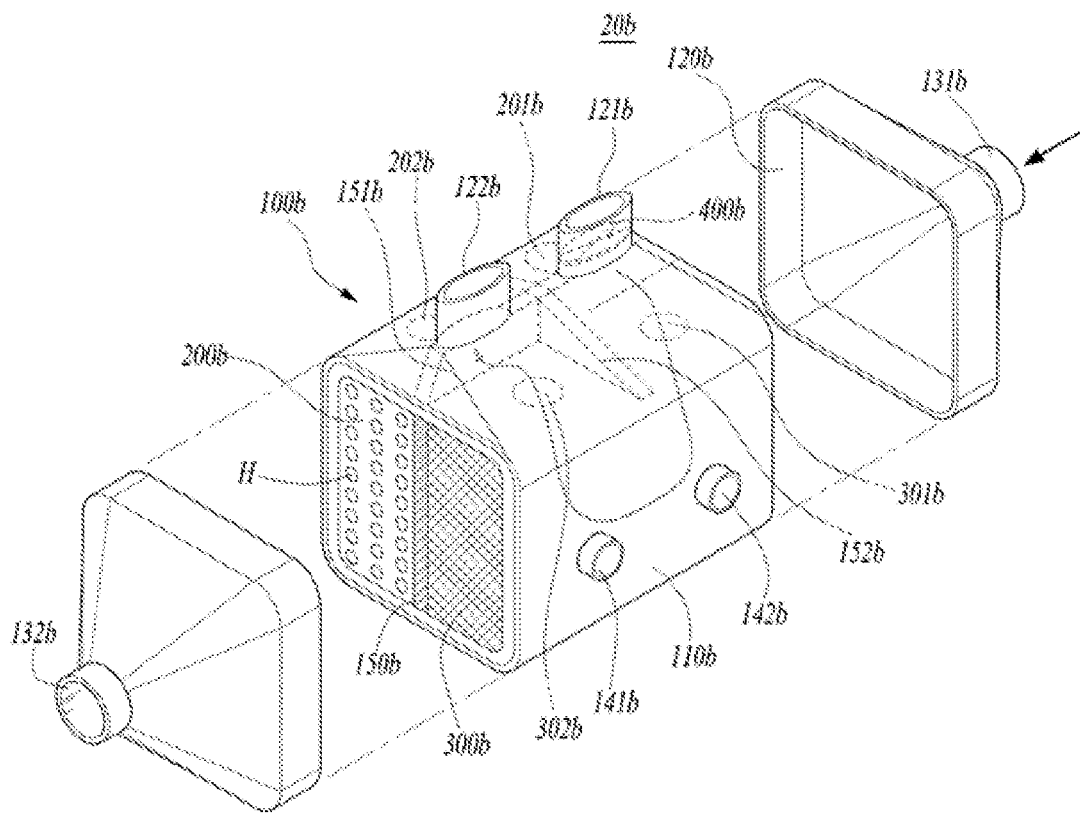
FIG. 15 is an exploded perspective view of a fuel cell membrane humidifier according to a further embodiment of the present disclosure.

A fuel cell membrane humidifier according to a further embodiment of the present disclosure will be described with reference to FIGS. 15 and 16. FIG. 15 is an exploded perspective view of a fuel cell membrane humidifier 20*b* according to a further embodiment of the present disclosure, and FIG. 16 is a plan view of the fuel cell membrane humidifier of FIG. 15.

Figure 16:
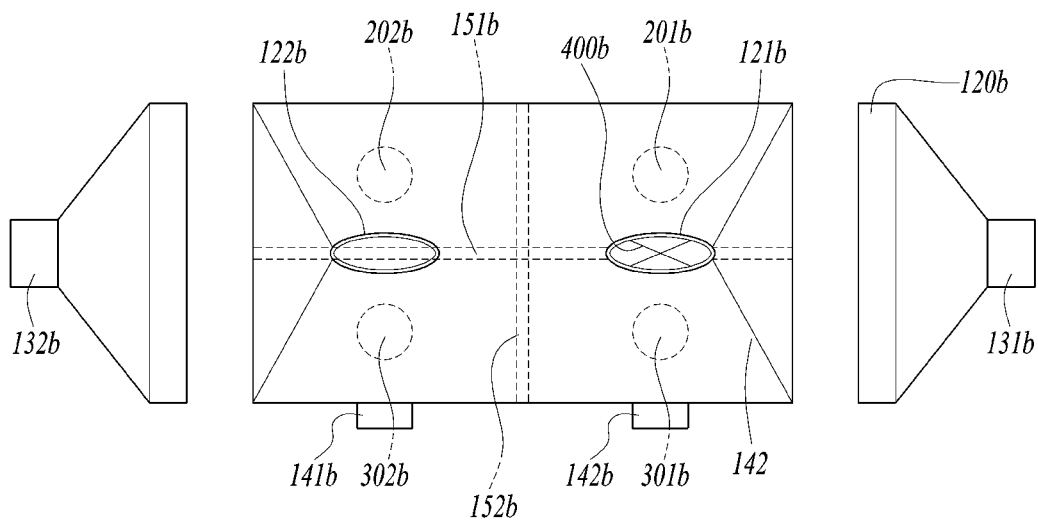
FIG. 16 is a plan view of the fuel cell membrane humidifier of FIG. 15.

Substantially similarly to the previous embodiment, the fuel cell membrane humidifier shown in FIGS. 15 and 16 includes a housing unit 100*b*, a humidification module 200*b*, a heat exchange module 300*b*, and a channel valve 400*b*. In this embodiment, a high-humidity second fluid is introduced and discharged through housing caps 120*b*, a dry (low-humidity) first fluid is introduced and discharged through a housing body 110*b*, and a first fluid inlet 121*b* and a first fluid outlet 122*b* are formed together in the upper surface or the lower surface of the housing body 110*b*.

A portion of an inner space of the housing body 110*b* is divided into two spaces (i.e. first and second spaces) by a partition wall 150*b*, and the humidification module 200*b*, which is configured to perform moisture exchange, and the heat exchange module 300*b*, which is configured to perform cooling through heat exchange, are disposed in the respective spaces.

The housing body 110*b* is provided in one surface (the upper surface or the lower surface) thereof with a first fluid inlet 121*b*, through which the first fluid is introduced, and a first fluid outlet 122*b*, through which the first fluid is discharged. The channel valve 400*b*, which is configured to distribute the first fluid to the humidification module 200*b* and the heat exchange module 300*b* at a variable distribution ratio, is formed in the first fluid inlet 121*b*. In addition, the housing body 110*b* in which the first fluid inlet 121*b* and the first fluid outlet 122*b* are formed may include an extending partition wall 151*b* configured to guide the first fluid introduced through the first fluid inlet 121*b* to the humidification module 200*b* and the heat exchange module 300*b* according to the distribution ratio set by the channel valve 400*b* and an intersecting partition wall 152*b* configured to prevent the first fluid flowing from the first fluid inlet 121*b* to the humidification module 200*b* and the heat exchange module 300*b* from being mixed with the first fluid flowing from the humidification module 200*b* and the heat exchange module 300*b* to the first fluid outlet 122*b*. The extending partition wall 151*b* and the intersecting partition wall 152*b* may intersect each other. The intersecting partition wall 152*b* may be formed between the first fluid inlet 121*b* and the first fluid outlet 122*b*, and divides a fluid flow space in the housing body 110*b* (i.e. a space between the humidification module 200*b* and the heat exchange module 300*b* and the housing body 110*b*) into four spaces together with the extending partition wall 151*b*.

The humidification module 200*b* is provided in one surface (the upper surface or the lower surface) thereof with a first introduction window 201*b*, through which the first fluid introduced through the first fluid inlet 121*b* is introduced into the humidification module 200*b*, and a first discharge window 202*b*, through which the first fluid, after being humidified through moisture exchange while flowing in the humidification module 200*b*, is discharged.

In addition, the heat exchange module 300*b* is provided in one surface (the upper surface or the lower surface) thereof with a second introduction window 301*b*, through which the first fluid introduced through the first fluid inlet 121*b* is introduced into the heat exchange module 300*b*, and a second discharge window 302*b*, through which the first fluid, after being cooled while flowing in the heat exchange module 300*b*, is discharged.

Each of the first and second introduction windows 201*b* and 301*b* and the first and second discharge windows 202*b* and 302*b* is formed through a portion of one surface of a corresponding one of the humidification module 200*b* and the heat exchange module 300*b*.

The portion of the housing body 110*b* corresponding to the heat exchange module 300*b* is provided with a coolant inlet 141*b*, through which a coolant is introduced, and a coolant outlet 142*b*, through which the coolant, after performing cooling, is discharged. The coolant inlet 141*b* and the coolant outlet 142*b* may be formed in a side surface of the housing body 110*b*.

The housing caps 120*b* are coupled respectively to opposite ends of the housing body 110*b*. A second fluid inlet 131*b*, is formed in one of the housing caps 120*b*, and a second fluid outlet 132*b* is formed in the other housing cap 120*b*.

The humidification module 200*b* and the heat exchange module 300*b* are identical to the humidification module and the heat exchange module of the previous embodiment, and therefore a duplicate description thereof will be omitted. In addition, the channel valve 400b is substantially identical in function and construction to the channel valve of the previous embodiment except that the channel valve is installed in the first fluid inlet 121b, and therefore a duplicate description thereof will be omitted.

The first fluid is guided to the humidification module 200b and/or the heat exchange module 300b by the extending partition wall 151b according to the distribution ratio set by the channel valve 400b.

At least a portion of the first fluid introduced through the first fluid inlet 121b is introduced into the humidification module 200b through the first introduction window 201b, and the remainder of the first fluid is introduced into the heat exchange module 300b through the second introduction window 301b. Depending on operation conditions, all of the first fluid is introduced only into any one of the humidification module 200b and the heat exchange module 300b. At this time, the intersecting partition wall 152b prevents the first fluid from being directly discharged through the first fluid outlet 122b without being introduced into the humidification module 200b and/or the heat exchange module 300b through the introduction windows 201b and 301b.

The first fluid introduced into the humidification module 200b and/or the heat exchange module 300b performs moisture exchange and/or heat exchange, and is discharged from the fuel cell membrane humidifier 20b through the first fluid outlet 122b.

Next, the operation of the fuel cell membrane humidifier according to the embodiment of the present disclosure will be described with reference to FIGS. 17 to 19. Meanwhile, the operation of the fuel cell membrane humidifier according to each of the other embodiments of the present disclosure is substantially identical to the operation of the fuel cell membrane humidifier according to this embodiment, and a duplicate description thereof will be omitted.

Figure 17:
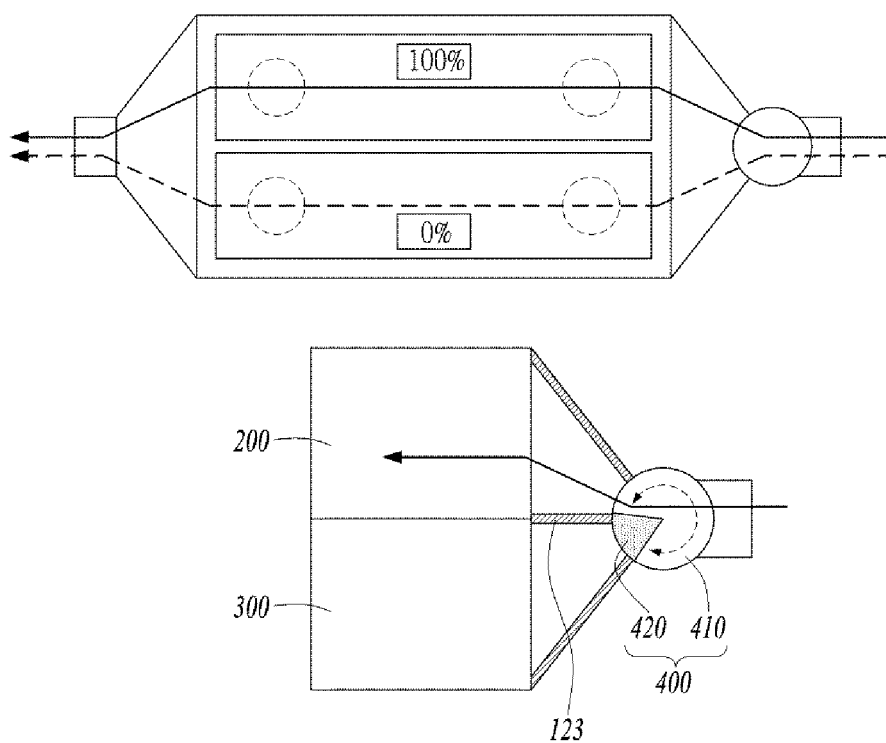
FIGS. 17 to 19 are schematic views used to describe the operation of the fuel cell membrane humidifier according to the embodiment of the present disclosure.

FIG. 17 shows an example in which the first fluid is introduced into only the humidification module 200 in order to realize only the function of a humidifier. The controller performs control such that the valve unit 420 blocks all flows to the heat exchange module 300. All of the dry air (the first fluid) compressed by the air compression means 10 flows into the hollow fiber membranes in the humidification module 200 and is discharged from the membrane humidifier through the first fluid outlet 122 of the other housing cap 120. In this process, the first fluid exchanges moisture with the second fluid introduced through the second fluid inlet 131.

Figure 18:
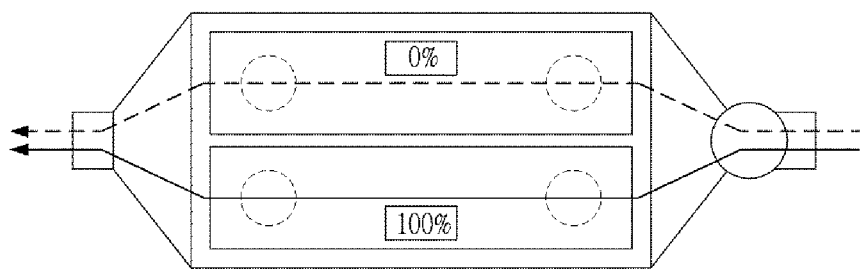
Figure 18:
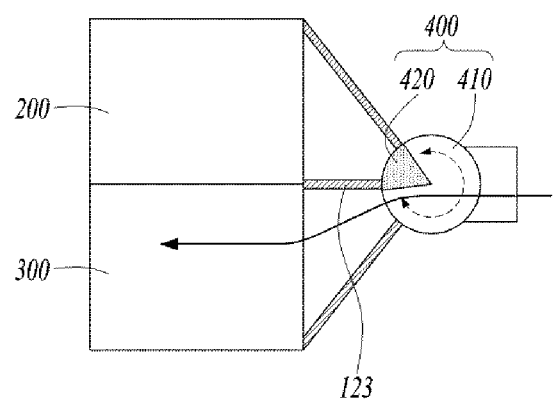

FIG. 18 shows an example in which the first fluid is introduced into only the heat exchange module 300 in order to realize only the function of a heat exchanger. The controller performs control such that the valve unit 420 blocks all flows to the humidification module 200. All of the dry air (the first fluid) compressed by the air compression means 10 flows into the heat exchange module 300 and is discharged from the membrane humidifier through the first fluid outlet 122 of the other housing cap 120. In this process, moisture exchange between the first fluid and the second fluid is not performed, and only heat exchange between the first fluid and the coolant is performed. At this time, it is possible to adjust the temperature and flow rate of the coolant that is introduced into the heat exchange module 300 in order to adjust the temperature of the first fluid discharged through the first fluid outlet 122 and introduced into the fuel cell stack 30 to a desired temperature.

Figure 19:
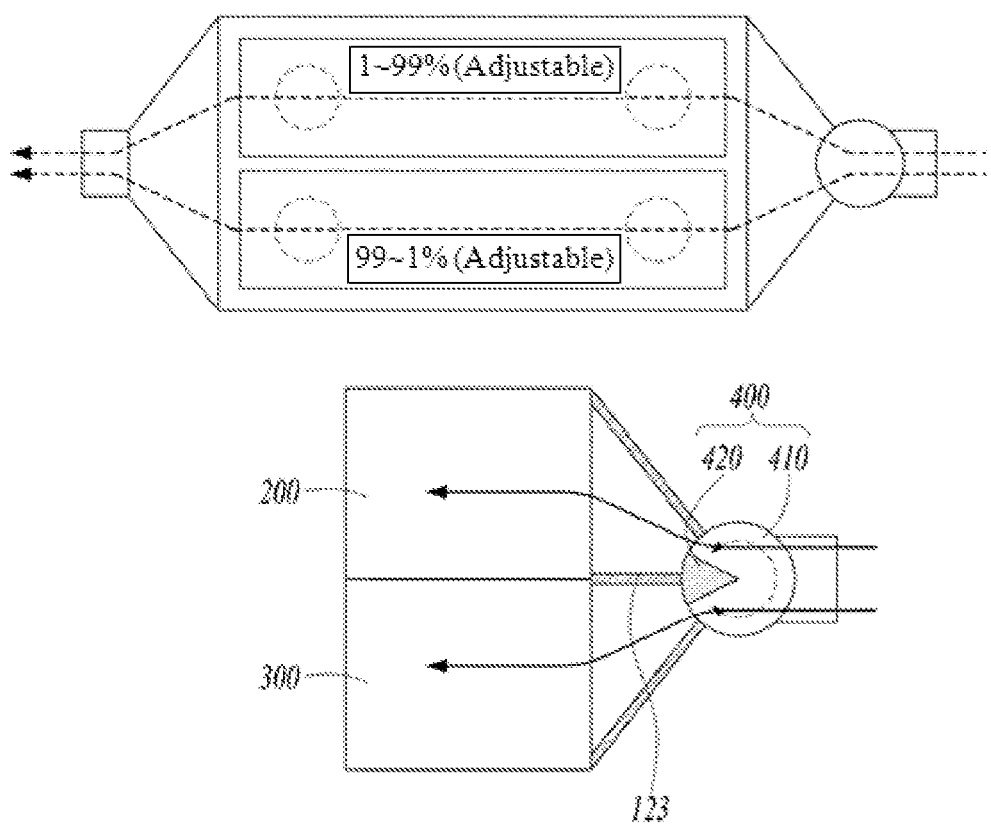

FIG. 19 shows an example in which the first fluid is introduced into the humidification module 200 and the heat exchange module 300 in order to realize humidification and heat exchange functions. The controller performs control such that the valve unit 420 blocks some flows to the humidification module 200 and the heat exchange module 300. At least a portion of the dry air (the first fluid) compressed by the air compression means 10 flows into the humidification module 200, and the remainder of the first fluid flows into the heat exchange module 300. Subsequently, the first fluid is discharged from the membrane humidifier through the first fluid outlet 122 of the other housing cap 120. The first fluid that has passed through the humidification module 200 and the first fluid that has passed through the heat exchange module 300 are discharged through the first fluid outlet 122 in a mixed state, and are introduced into the fuel cell stack 30. At this time, it is possible to adjust the amount of humidification through the channel valve 400 and to adjust the temperature and flow rate of the coolant that is introduced into the heat exchange module 300 in order to adjust the temperature of the first fluid in the mixed state. As a result, it is possible to adjust the humidified state and temperature of the first fluid that is introduced into the fuel cell stack 30 to a desired humidified state and a desired temperature.

Next, another example of the fuel cell system including the fuel cell membrane humidifier according to the embodiment of the present disclosure will be described with reference to FIG. 20.

Figure 20:
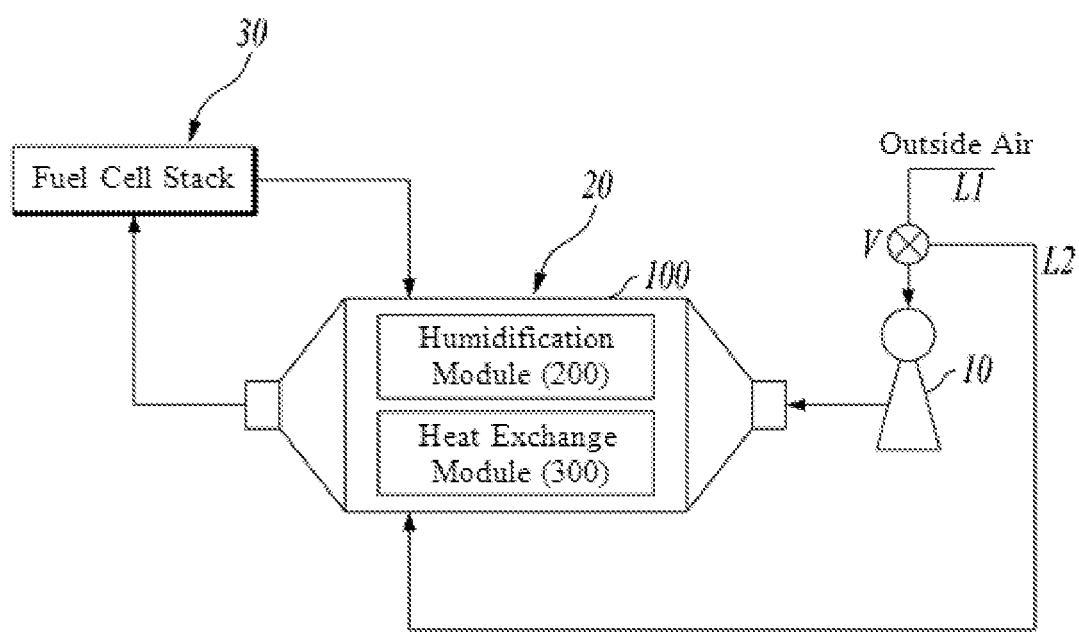
FIG. 20 is a schematic view of another example of the fuel cell system including the fuel cell membrane humidifier according to the embodiment of the present disclosure.

As shown in FIG. 20, the fuel cell system according to the other embodiment of the present disclosure includes an air compression means 10, a fuel cell membrane humidifier 20, a fuel cell stack 30, a bypass channel L2, and a bypass valve V.

The fuel cell system according to this embodiment is identical in construction to the fuel cell system according to the previous embodiment except that the bypass channel L2 and the bypass valve V are further included, and therefore a detailed description of the air compression means 10, the fuel cell membrane humidifier 20, and the fuel cell stack 30 will be omitted.

The fuel cell system according to this embodiment includes a bypass channel L2 diverging from the outside air supply channel L1 installed upstream of the front of the air compression means 10 so as to be connected to the coolant inlet 141 of the heat exchange module 300. A bypass valve V configured to adjust a bypass flow rate is formed in the outside air supply channel L1.

In the fuel cell system according to the previous embodiment, the heat exchange module 300 cools the first fluid using a coolant supplied from outside. In this case, a separate coolant storage means must be provided in order to supply such a coolant. As a result, it is difficult to simplify and miniaturize the fuel cell system.

In this embodiment, at least a portion of outside air that would otherwise be introduced into the air compression means 10 is supplied to the heat exchange module 300 through the bypass channel L2 in order to cool the first fluid. For an air-cooling type heat exchanger, therefore, it is not necessary to provide a separate coolant storage means configured to supply a coolant, whereby it is possible to construct a much more simplified/miniaturized fuel cell system.

The invention claimed is:

1. A fuel cell membrane humidifier comprising:
a housing unit having first and second spaces, between which a partition wall is disposed;

a humidification module disposed in the first space, the humidification module comprising a plurality of hollow fiber membranes, moisture exchange being performed between a first fluid and a second fluid through the plurality of hollow fiber membranes, the second fluid having higher humidity than the first fluid;

a heat exchange module disposed in the second space, the heat exchange module being configured to cool the first fluid introduced thereinto; and a channel valve configured to distribute the first fluid to the humidification module and the heat exchange module at a variable distribution ratio, wherein the housing unit comprises:

a housing body having the first and second spaces defined therein; and housing caps coupled respectively to opposite ends of the housing body, the housing caps being provided respectively with first fluid inlet, through which the first fluid is introduced, and a first fluid outlet, through which the first fluid is discharged, and wherein the housing cap provided with the first fluid inlet comprises the channel valve and a cap partition wall configured to guide the first fluid to the humidification module and the heat exchange module according to a distribution ratio set by the channel valve.

2. A fuel cell membrane humidifier comprising:

a housing unit having first and second spaces, between which a partition wall is disposed;

a humidification module disposed in the first space, the humidification module comprising a plurality of hollow fiber membranes, moisture exchange being performed between a first fluid and a second fluid through the plurality of hollow fiber membranes, the second fluid having higher humidity than the first fluid;

a heat exchange module disposed in the second space, the heat exchange module being configured to cool the first fluid introduced thereinto; and a channel valve configured to distribute the first fluid to the humidification module and the heat exchange module at a variable distribution ratio, wherein the housing unit comprises:

a housing body having the first and second spaces defined therein, the housing body being provided with a first fluid inlet, through which the first fluid is introduced, and a first fluid outlet, through which the first fluid is discharged; and housing caps coupled respectively to opposite ends of the housing body, the housing caps being provided respectively with a second fluid inlet, through which the second fluid is introduced, and a second fluid outlet, through which the second fluid is discharged, and wherein the housing body comprises an extending partition wall configured to guide the first fluid to the humidification module and the heat exchange module according to a distribution ratio set by the channel valve.

3. The fuel cell membrane humidifier according to claim 2, wherein both the first fluid inlet and the first fluid outlet are on one surface of the housing body, and wherein the housing body further comprises intersecting partition wall configured to prevent the first fluid flowing from the first fluid inlet to the humidification module and the heat exchange module from being mixed with the first fluid flowing from the humidification module and the heat exchange module to the first fluid outlet.

4. The fuel cell membrane humidifier according to claim 1, wherein the heat exchange module is a shell and tube type heat exchange module, a honeycomb type heat exchange module, or a plate type heat exchange module.

5. The fuel cell membrane humidifier according to claim 1, wherein the channel valve is configured to be controlled depending on an output state of a fuel cell stack.

6. A fuel cell membrane humidifier comprising:

a housing unit having first and second spaces, between which a partition wall is disposed;

a humidification module disposed in the first space, the humidification module comprising a plurality of hollow fiber membranes, moisture exchange being performed between a first fluid and a second fluid through the plurality of hollow fiber membranes, the second fluid having higher humidity than the first fluid;

a heat exchange module disposed in the second space, the heat exchange module being configured to cool the first fluid introduced thereinto; and a channel valve configured to distribute the first fluid to the humidification module and the heat exchange module at a variable distribution ratio, wherein the housing unit comprises a coolant inlet, through which a coolant is supplied to the heat exchange module, and a coolant outlet, through which the coolant, after performing cooling, is discharged, and the coolant inlet is connected to a bypass channel configured to bypass at least a portion of outside air that would otherwise be introduced into an air compression means.

7. A fuel cell system comprising:

an air compression means configured to receive and compress outside air in order to generate a first fluid;

a fuel cell stack configured to generate a second fluid through reaction between hydrogen and oxygen, the second fluid having higher humidity than the first fluid; and the fuel cell membrane humidifier according to claim 1.

8. A fuel cell system comprising:

an air compression means configured to receive and compress outside air in order to generate a first fluid;

a fuel cell stack configured to generate a second fluid through reaction between hydrogen and oxygen, the second fluid having higher humidity than the first fluid; and the fuel cell membrane humidifier according to claim 2.

9. The fuel cell system according to claim 8, wherein both the first fluid inlet and the first fluid outlet are provided on one surface of the housing body, and wherein the housing body further comprises an intersecting partition wall configured to prevent the first fluid flowing from the first fluid inlet to the humidification module and the heat exchange module from being mixed with the first fluid flowing from the humidification module and the heat exchange module to the first fluid outlet.

10. The fuel cell system according to claim 7, further comprising:

a sensing unit configured to sense an output state of the fuel cell stack; and a controller configured to output a control signal for controlling the channel valve based on the output state of the fuel cell stack sensed by the sensing unit.

11. A fuel cell system comprising:

an air compression means configured to receive and compress outside air in order to generate a first fluid;

a fuel cell stack configured to generate a second fluid through reaction between hydrogen and oxygen, the second fluid having higher humidity than the first fluid; and the fuel cell membrane humidifier according to claim 6.

12. The fuel cell system according to claim 7, wherein the housing unit comprises a coolant inlet, through which a coolant is supplied to the heat exchange module, and a coolant outlet, through which the coolant, after performing cooling, is discharged, and the coolant inlet is connected to a bypass channel configured to bypass at least a portion of outside air that would otherwise be introduced into the air compression means.

13. The fuel cell system according to claim 8, wherein the housing unit comprises a coolant inlet, through which a coolant is supplied to the heat exchange module, and a coolant outlet, through which the coolant, after performing cooling, is discharged, and the coolant inlet is connected to a bypass channel configured to bypass at least a portion of outside air that would otherwise be introduced into the air compression means.

14. The fuel cell system according to claim 9, wherein the housing unit comprises a coolant inlet, through which a coolant is supplied to the heat exchange module, and a coolant outlet, through which the coolant, after performing cooling, is discharged, and the coolant inlet is connected to a bypass channel configured to bypass at least a portion of outside air that would otherwise be introduced into the air compression means.

* * * * *